(12) United States Patent
Leonard et al.

(10) Patent No.: US 11,646,995 B2
(45) Date of Patent: May 9, 2023

(54) PARTITIONED INTRUSION DETECTION

(71) Applicant: Cisco Technology, Inc., San Jose, CA (US)

(72) Inventors: Cynthia Leonard, Bangalore (IN); George Mathew Koikara, Bangalore (IN); Kaushal Bhandankar, Bangalore (IN); Prajwal Srinivas Sreenath, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 302 days.

(21) Appl. No.: 16/711,101

(22) Filed: Dec. 11, 2019

(65) Prior Publication Data

US 2021/0185006 A1  Jun. 17, 2021

(51) Int. Cl.
*H04L 9/40* (2022.01)
*H04L 12/46* (2006.01)

(52) U.S. Cl.
CPC ...... *H04L 63/0209* (2013.01); *H04L 12/4645* (2013.01); *H04L 63/0245* (2013.01); *H04L 63/0272* (2013.01); *H04L 63/1408* (2013.01); *H04L 63/1416* (2013.01); *H04L 63/1466* (2013.01); *H04L 63/168* (2013.01); *H04L 63/20* (2013.01)

(58) Field of Classification Search
CPC . H04L 63/1408; H04L 63/20; H04L 63/0209; H04L 63/0245; H04L 63/0272; H04L 63/1416; H04L 63/168; H04L 63/1466; H04L 12/4645
USPC ........................................................ 726/11
See application file for complete search history.

(56) References Cited

U.S. PATENT DOCUMENTS

| 8,079,077 B2 | 12/2011 | Chen et al. |
| 8,396,946 B1 * | 3/2013 | Brandwine ............ H04L 41/08 709/224 |
| 8,751,787 B2 | 6/2014 | Wang |

(Continued)

FOREIGN PATENT DOCUMENTS

KR    20090081639 A    7/2009

OTHER PUBLICATIONS

Vasudeo et al., 2015 International Conference on Smart Technologies and Management for Computing, Communication, Controls, Energy and Materials (ICSTM), "IMMIX-Intrusion Detection and Prevention System", pp. 96-101 (Year: 2015).*

(Continued)

*Primary Examiner* — Khalil Naghdali
(74) *Attorney, Agent, or Firm* — Lee & Hayes, P.C.

(57) ABSTRACT

This disclosure describes methods to distribute intrusion detection in a network across multiple devices in the network, such as across routing/switching or other infrastructure devices. For example, as a packet is routed through a network infrastructure, an overlay mechanism may be utilized to indicate which of a total set of intrusion detection rules have been applied to the packet. Each infrastructure device may evaluate which rules have already been applied to the packet, using a result of the evaluation to determine where to route the packet in the network infrastructure for application of additional intrusion detection rules. Additionally, each infrastructure device may record a result of its application of the portion of intrusion detection rules directly into the packet.

20 Claims, 5 Drawing Sheets

(56) References Cited

U.S. PATENT DOCUMENTS

| | | | |
|---|---|---|---|
| 8,964,528 B2* | 2/2015 | Casado | H04L 45/745 370/408 |
| 9,871,816 B2 | 1/2018 | Tamir et al. | |
| 9,935,829 B1* | 4/2018 | Miller | H04L 41/0896 |
| 2011/0099631 A1* | 4/2011 | Willebeek-LeMair | H04L 63/0227 726/23 |
| 2014/0280889 A1* | 9/2014 | Nispel | H04L 63/029 709/224 |
| 2015/0244617 A1* | 8/2015 | Nakil | G06F 11/07 709/224 |
| 2019/0230126 A1 | 7/2019 | Kumar et al. | |

OTHER PUBLICATIONS

Shafi et al., 2018 IEEE Access, "Fog-Assisted SDN Controlled Framework for Enduring Anomaly Detection in an IoT Network", pp. 73713-73723 (Year: 2018).*

Shafi et al., 2018 IEEE, "Fog-Assisted SDN Controlled Framework for Enduring Anomaly Detection in an IoT Network", pp. 73713-73723 (Year: 2018).*

Shiri et al., 2011 IEEE, "A Parallel Technique for Improving the Performance of Signature-Based Network Intrusion Detection System", pp. 692-696 (Year: 2011).*

* cited by examiner

PARTITIONED INTRUSION DETECTION

TECHNICAL FIELD

The present disclosure relates generally to intrusion detection in networks and, more specifically, to a methodology that allows for intrusion detection in accordance with increasing numbers of rules, while also maximizing efficacy of the inspection.

BACKGROUND

An intrusion prevention system (IPS) is a system that, among other things, inspects incoming data traffic to a network to identify a security threat, security policy violation, or some other malicious or suspicious activity. An IPS, upon detection of such activity, may then attempt to block and report the activity.

IPS inspection typically comprises applying intrusion detection rules to packets flowing in or out of the network. As just one example, each intrusion detection rule may have an associated pattern, and applying the intrusion detection rule may include inspecting an incoming packet to determine if the incoming packet matches the associated pattern. The pattern matching determination can be compute-intensive, and the effectiveness of IPS inspection may depend on available computing power for performing it. With new intrusion threats being constantly developed and discovered, additional intrusion detection rules may need to be incorporated into the IPS inspection. Performing additional pattern matching determination and/or other intrusion detection can lead to increased load on the computational resources performing the intrusion detection, which can also lead to possible network latency.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
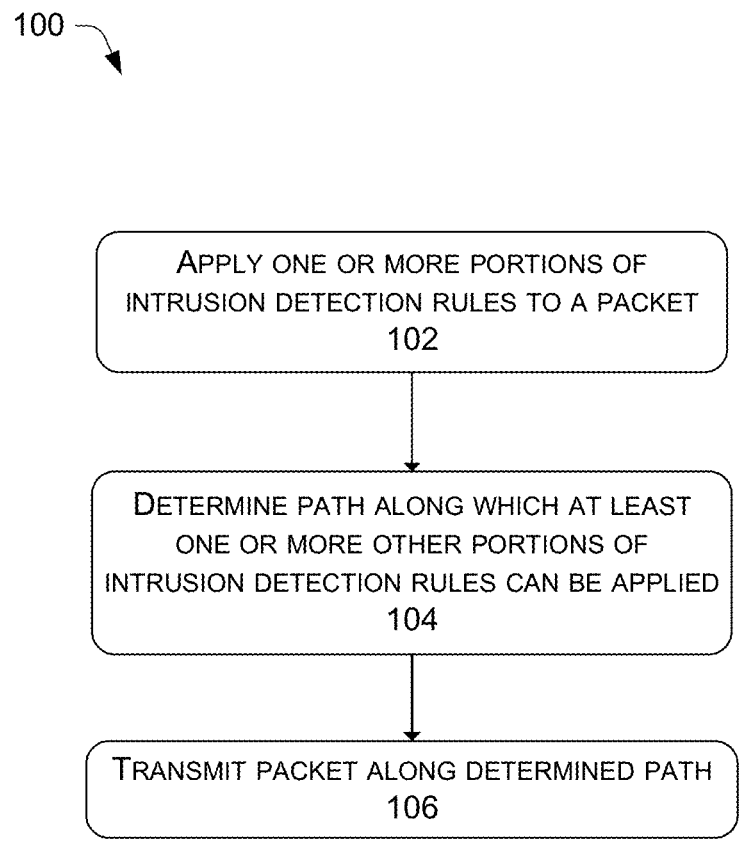
FIG. 1 illustrates a process by which a single infrastructure device may participate in a distributed intrusion detection process.

This disclosure describes methods of applying intrusion detection rules to a packet in a network. At a first infrastructure device of the network, a first portion of the intrusion detection rules is applied to the packet. At a second infrastructure device of the network, a second portion of the intrusion detection rules is applied to the packet.

Additionally, the techniques described herein may be performed by a system and/or device having non-transitory computer-readable media storing computer-executable instructions that, when executed by one or more processors, performs the methods described herein.

EXAMPLE EMBODIMENTS

The described methods are usable to perform intrusion detection in a network across multiple network infrastructure devices in the network, by applying intrusion detection rules to a packet in a network. Infrastructure devices in a network are devices that allow devices to connect and communicate. Examples of such devices include, but are not limited to, the following: routers, switches, hubs, bridges, gateways, firewalls and repeaters.

The packet is provided to the multiple network infrastructure devices, and each network infrastructure device to which the packet is provided applies a portion of the intrusion detection rules. In one example, a network infrastructure device at an edge of the infrastructure network may receive a packet indicating a particular destination (such as network server or subnet). In other examples, the network infrastructure device is not at the edge of the infrastructure network. With knowledge of which portions of the intrusion detection rules each network infrastructure device is configured to apply, the network infrastructure device may determine a path through the network infrastructure devices for the packet to achieve a specified efficacy of applying the intrusion detection rules to the packet. In some examples, the network infrastructure device may encapsulate the packet in an overlay packet. In other examples, the packet is not encapsulated in an overlay packet. In examples in which the packet is encapsulated in an overlay packet, the overlay packet may be, for example, a VXLAN (Virtual eXtensible Local Area Network), IPv6 (Internet Protocol, version 6) or VLAN (Virtual Local Area Network) type of overlay packet, though other types of overlays are possible as well. The overlay mechanism at least in part dictates, at each network infrastructure device to which a packet is provided, to which network infrastructure device the packet should be provided next. The overlay mechanism defines an overlay network that conceptually (virtually) is built on top of another network and is supported by the infrastructure of the underlying network infrastructure. An overlay network encapsulates one packet, of the underlying network, inside of another packet, of the overlay network. An overlay mechanism may include, for example, VXLAN and IPv6 at Layer 3 or VLAN at Layer 2, where Layer 3 and Layer 2 refer to layers of a network stack as defined by the Open Systems Interconnection model for network organization. See, for example, ISO/IEC 7498-1, Information technology—Open Systems Interconnection—Basic Reference Model: The Basic Model (Corrected and reprinted, 1996 Jun. 15). For more information about VXLAN, see "Virtual eXtensible Local Area Network (VXLAN): A Framework for Overlaying Virtualized Layer 2 Networks over Layer 3 Networks", RFC7348, dated August 2014. For more information about IPv6, see "Internet Protocol, Version 6 (IPv6) Specification", RFC2460, dated December 1998.

The VXLAN-type packet may have a security header, and the network infrastructure device may indicate, in the security header of the VXLAN-type packet, which one or more portions of the intrusion detection rules the network infrastructure device has applied to the packet. In one example, as the VXLAN-type packet with security header traverses the network infrastructure devices, each network infrastructure device applies the one or more portions of the intrusion detection rules of which the respective infrastructure device is capable of applying. The respective network infrastructure device may then indicate, in the security header of the VXLAN-type packet, which one or more portions of the intrusion detection rules the respective network infrastructure device applied to the packet. In some examples, when the packet is provided to subsequent network infrastructure devices, each subsequent network infrastructure device determines from the header what portions of the intrusion detection rules have already been applied to the packet. Each subsequent network infrastructure device applies one or more portions of the intrusion detection rules that the respective network infrastructure device determines have not already been applied to the packet, and the respective network infrastructure device updates the security header to indicate the application of the one or portions of the intrusion detection rules that the respective network infrastructure device has applied. This continues for all network infrastructure devices to which the packet is provided. In some examples, this results in all the portions of the intrusion detection rules having been applied to the packet. In some examples, this results in fewer than all portions of the intrusion detection rules having been applied to the packet but, in some of those examples, the portions of the intrusion detection rules that have been applied to the packet result in an efficacy that is at least as high as a specified efficacy of intrusion detection rule application.

In another example, the VXLAN-type packet may not have a security header. In the example where the VXLAN-type packet may not have a security header (and, also, in some cases where the VXLAN-type packet does have a security header), each network infrastructure device to which the packet is provided may apply one or more portions of the intrusion detection rules to the packet based on a pre-stored configuration, depending at least on the VXLAN value of the packet. As the packet is provided to a network infrastructure device such as an network infrastructure device, the network infrastructure device may apply the one or more portions of the intrusion detection rules to the packet based on the pre-stored configuration (or otherwise determined), append a specific VXLAN header to the packet, and forward the packet. The next network infrastructure device to which the packet is provided can recognize the VXLAN header of the packet which it has been provided and apply one or more portions of the intrusion detection rules to the packet based at least on the VXLAN header and on a configuration of the respective network infrastructure node. In this way, based at least on the VXLAN header appended by a previous network infrastructure device which has provided the packet and a configuration of a network infrastructure device to which the packet has been provided, the network infrastructure device to which the packet has been provided may apply one or more portions of the intrusion detection rules. The intrusion detection processing may support VXLAN based security profiles.

In yet another example, an IPv6-type packet is employed. A network infrastructure device may indicate, in a security header of the IPv6-type packet, which one or more portions of the intrusion detection rules the edge network infrastructure device has applied to the packet. In one example, as the IPv6-type packet with security header traverses the network infrastructure devices, each network infrastructure device applies the one or more portions of the intrusion detection rules of which the respective infrastructure device is capable of applying. The respective network infrastructure device may then indicate, in the security header of the IPv6-type packet, which one or more portions of the intrusion detection rules the respective network infrastructure device applied to the packet In some examples, when the packet is provided to subsequent network infrastructure devices, each subsequent network infrastructure device determines from the header what portions of the intrusion detection rules have already been applied to the packet. Each subsequent network infrastructure device applies one or more portions of the intrusion detection rules that the respective network infrastructure device determines have not already been applied to the packet, and the respective network infrastructure device updates the security header to indicate the application of the one or portions of the intrusion detection rules that the respective network infrastructure device has applied. This continues for all network infrastructure devices to which the packet is provided. In some examples, this results in all the portions of the intrusion detection rules having been applied to the packet. In some examples, this results in fewer than all portions of the intrusion detection rules having been applied to the packet but, in some of those examples, the portions of the intrusion detection rules that have been applied to the packet result in an efficacy that is at least as high as a specified efficacy of intrusion detection rule application.

In another example, a VLAN-type packet is utilized. The VLAN-type packet may not have a security header. In the example where the VLAN-type packet does not have a security header (and, also, in the case where the VLAN-type packet does have a security header), each network infrastructure device to which the packet is provided may apply one or more portions of the intrusion detection rules to the packet based on a pre-stored configuration, depending at least on the VLAN value of the packet. As the packet is provided to a network infrastructure device, the network infrastructure device may apply the one or more portions of the intrusion detection rules to the packet based on the pre-stored configuration (or otherwise determined), append a specific VLAN header to the packet, and forward the packet. The next network infrastructure device to which the packet is provided can recognize the VLAN header of the packet which it has been provided and apply one or more portions of the intrusion detection rules to the packet based at least on the VLAN header and on a configuration of the respective network infrastructure node. In this way, based at least on the VLAN header appended by a previous network infrastructure device which has provided the packet and a configuration of a network infrastructure device to which the packet has been provided, the network infrastructure device to which the packet has been provided may apply one or more portions of the intrusion detection rules. The intrusion detection processing may support VLAN based security profiles.

In some examples, it is determined dynamically to which network infrastructure devices an incoming packet is provided for application of one or more portions of the intrusion detection rules. The dynamic determination may be based on which portions of the intrusion detection rules have already been applied to the packet and/or which portions of the intrusion detection rules have not yet been applied to the packet. The network infrastructure devices to which the packet is provided for intrusion detection inspection may be determined as the packet traverses the multiple network infrastructure devices. For example, a network infrastructure device to which the packet has been provided may determine, based on portions of the intrusion detection rules that have not yet been applied to the packet, that the packet should be provided to another network infrastructure device that has capability to perform one or more of the portions of the intrusion detection rues that have not yet been applied to the packet. In this way, as the packet is provided to an additional network infrastructure device, the one or more additional portions of the intrusion detection rules may be applied to the packet, thus increasing the efficacy of intrusion detection. The network infrastructure devices to which the packet is collectively provided may apply sufficient portions of the intrusion detection rules to achieve a specified efficacy of intrusion detection for the packet. In some examples, the specified efficacy of intrusion detection may be less than one hundred percent.

In some examples, a packet to which intrusion detection rules are to be applied is provided in parallel to network infrastructure devices, for each network infrastructure device to apply one or more portions of the intrusion detection rules. Typically, each network infrastructure device to which the packet is provided applies a different one or more portions of the intrusion detection rules than any other one of the network infrastructure devices to which the packet is provided. In one such example, the packet is distributed to a plurality of network infrastructure devices by multicast transmission. Each network infrastructure device may apply one or more portion of the intrusion detection rules to the packet. Each network infrastructure device may report a result of the intrusion detection rule application by the respective network infrastructure device, such as by unicast packet transmission, to a device (which may be a network infrastructure device) that assembles the results, that can be used to determine an overall intrusion detection result. Furthermore, the result can be used to determine whether to block or allow the packet to proceed.

The techniques described herein may be performed by a system and/or device having non-transitory computer-readable media storing computer-executable instructions that, when executed by one or more processors, performs the methods described herein.

FIG. 1 illustrates a process 100 by which a single network infrastructure device may participate in distributed intrusion detection. The process 100 (or other processes) may be utilized by other network infrastructure devices so that, collectively, the single network infrastructure device and the other network infrastructure devices apply a plurality of portions of intrusion detection rules, in some examples to achieve a specified efficacy of intrusion detection. At 102, the single network infrastructure device applies one or more portions of the intrusion detection rules to a packet. This may include, for example, performing pattern matching of patterns associated with the portion of intrusion detection rules to a packet that has been provided to the single network infrastructure device, to determine if the packet exhibits a pattern associated with the portion of the intrusion detection rules.

In some examples, the packet is encapsulated by an overlay. The single network infrastructure device provides the encapsulated packet to another network infrastructure device, for the network infrastructure device to which the encapsulated packet is provided to apply one or more portions of the intrusion detection rules. The one or more portions of the intrusion detection rules applied by the network infrastructure device to which the encapsulated packet is provided may be a different one or more portions of the intrusion detection rules than the one or more portions of the intrusion detection rules applied by the single network infrastructure device, that provides the encapsulated packet. In a security header, other header or other portion of the encapsulated packet, each network infrastructure device that applies one or more portions of the intrusion detection rules to the packet indicates which one or more portions of the intrusion detection rules the respective network infrastructure device has applied.

At 104, the single infrastructure device determines a path in the network infrastructure along which at least one other portion of the intrusion detection rules may be applied to the packet. In some examples, the entire path is predetermined, such as according to a characteristic of the packet which may be, for example, an indication of the path within a header portion of the packet or a stored indication in the single infrastructure device how to route packets having the characteristic of the packet. In other examples, a determination of the path may be based on an indication in the packet of what portions of the intrusion detection rules have already been applied and/or what portions of the intrusion detection rules have not already been applied. In some examples, this path determination is a determination of a next hop for the packet based, for example, on a determination of which next hop network infrastructure device may advance the packet to a specified destination within the network infrastructure, with or without regard for what portions of the intrusion detection rules have already been applied and/or what portions of the intrusion detection rules have not already been applied.

Figure 2:
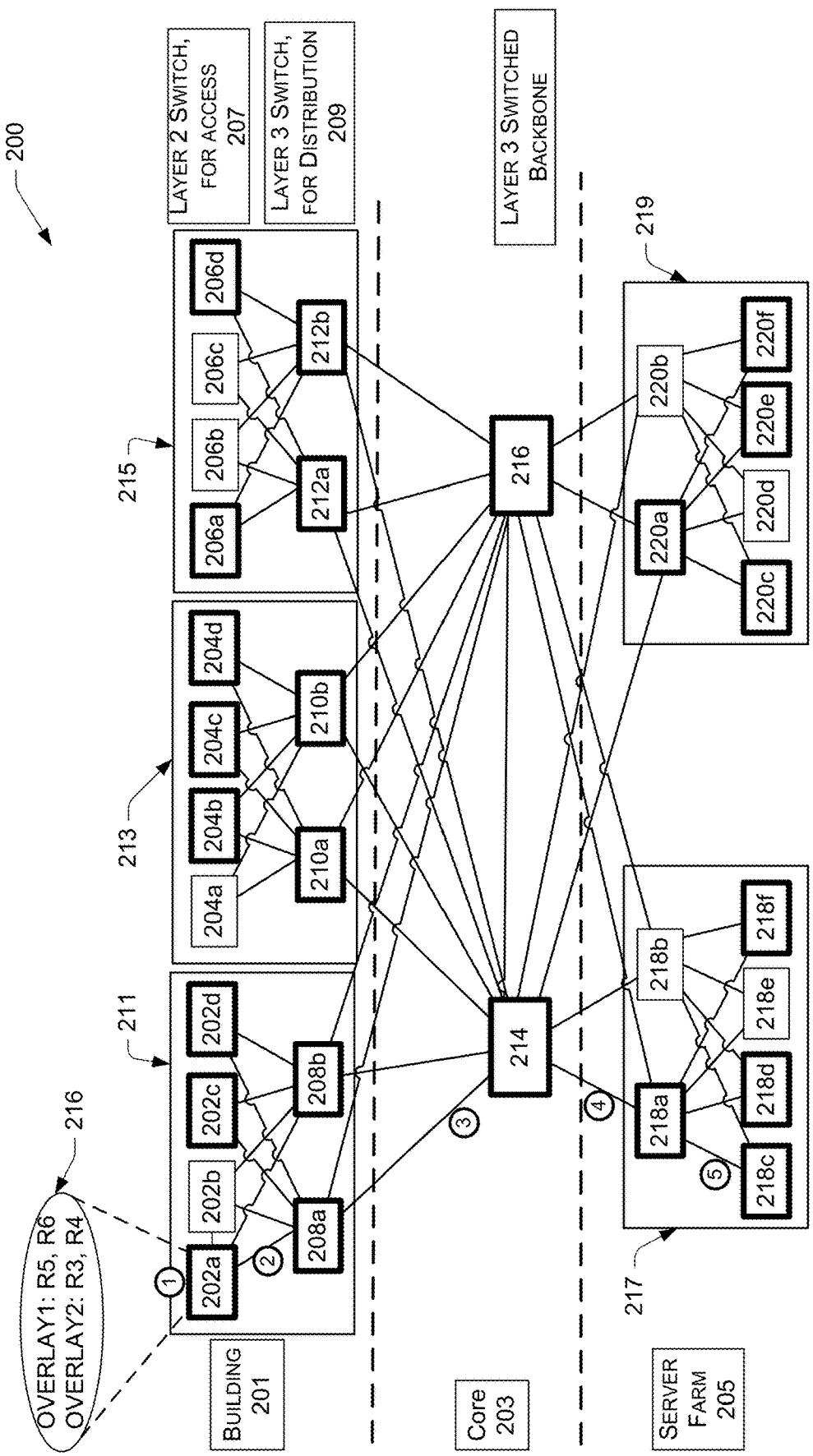
FIG. 2 illustrates an example network infrastructure system in which a distributed intrusion detection process may be accomplished.

FIG. 2 illustrates an example network infrastructure system 200 in which a distributed intrusion detection process may be accomplished. The example network infrastructure system may, for example, connect devices to network resources. Network resources may include, for example, data centers and a Wide Area Network (WAN) edge. In the example network infrastructure system 200, network infrastructure devices are distributed among a building layer 201, a core layer 203 and a server farm layer 205. The building layer 201 may include an access layer 207, which is a first line of access by devices to network. For example, in a Local Area Network (LAN) environment, the access layer 207 may operate to grant end devices access to the network and, in a WAN environment, the access layer 207 may provide teleworkers or remote sites access to a corporate network across WAN connections.

The building layer 201 may also include a distribution layer 209. The distribution layer 209 may, for example, aggregate data received from the access layer 207 as the data is transmitted to the core layer 203 for routing to a destination. As is discussed below, the distribution layer 209 may serve as a boundary between the Layer 2 domain of the network infrastructure system 200 and the Layer 3 routed network portion of the network infrastructure system 200. The core layer 203 serves as network backbone, and every component of the network infrastructure system 200 depends on it for connectivity.

FIG. 2 illustrates one example configuration of a network infrastructure system, and other example configurations are possible. For example, in some example configurations, distribution and core layers may be collapsed together. In other example configurations, the number of devices and interconnections at and between each layer may be different.

Referring still to the FIG. 2 example network infrastructure system 200, at the building layer 201, network infrastructure devices are distributed throughout three different physical buildings 211, 213 and 215. In each of the buildings 211, 213 and 215, the access layer 207 comprises include layer 2 switches. For example, in the building 211, layer 2 switches include network infrastructure devices 202a, 202b, 202c and 202d. In the building 213, layer 2 switches include network infrastructure devices 204a, 204b, 204c and 204d. In the building 215, layer 2 switches include network infrastructure devices 206a, 206b, 206c and 206d.

The network infrastructure devices in buildings 211, 213 and 215 also include network infrastructure devices that are layer 3 switches, at the distribution layer 209. These layer 3 switch network infrastructure devices include, in building 211, network infrastructure devices 208a and 208b. In building 213, these layer 3 switch network infrastructure devices include network infrastructure devices 210a and 210b. In building 215, these layer-3 switch network infrastructure devices include network infrastructure devices 212a and 212b.

At the core layer 203 of the example network infrastructure system 200, there are network infrastructure devices 214 and 216, which may be layer 3 switch backbone network infrastructure devices. Finally, at a server farm layer 205 of the example network infrastructure system 200, there are network infrastructure devices 218a, 218b, 218c, 218d and 218e in facility 217; and network infrastructure devices 220a, 220b, 220c, 220d, 220e and 220f in facility 219.

Using the FIG. 2 example network infrastructure 200, an incoming packet arriving at the network infrastructure 200 may arrive at the building layer 201 and travel in the direction from building layer 201, to core layer 203 to sever farm (or other resource) layer 205, and intrusion detection rules are applied to the packet by various network infrastructure devices as the packet travels through the network infrastructure 200. In the example network infrastructure system 200, some of the network infrastructure devices are configured to each apply a portion of a set of intrusion detection rules to packets, and each of some network infrastructure devices may apply a different portion of the set of intrusion detection rules to packets.

For purpose of illustration and example, network infrastructure devices in the FIG. 2 example network infrastructure 200 that are configured to apply a portion of a set of intrusion detection rules to packets are shown with a bold outline. The network infrastructure devices in the FIG. 2 example network infrastructure 200 that are configured to apply a portion of a set of intrusion detection rules to packets include the following network infrastructure devices: network infrastructure devices 202a, 202c, 202d, 204b, 204c, 204d, 206a, 206d at the access layer 207; network infrastructure devices 208a, 208b, 210a, 210b, 212a, 212b at the distribution layer 209; network infrastructure devices 214 and 216 at the core layer 205, and network infrastructure devices 218a, 218c, 218d, 218f, 220a, 220c, 220e and 220f at the server farm layer 205.

Furthermore, each of these network infrastructure devices, which are configured to apply a portion of a set of intrusion detection rules to packets, may be able to record, in an encapsulating header of a packet being inspected, an indication of which portions of the intrusion detection rules each respective device is configured to apply and has applied to a packet. An example of this is shown by reference numeral 216 in FIG. 2, for network infrastructure device 202a in the access layer 207. In the example shown by reference numeral 216, the network infrastructure device 202a is configured to apply different portions of the intrusion detection rules depending on one or more overlays to which the network infrastructure device belongs and which an encapsulating header of a packet under inspection indicates. In the example, the network infrastructure device 202a is configured to apply intrusion detection rules portions R5 and R6 of the intrusion detection rules for packets whose encapsulating header indicates overlay 1, and the network infrastructure device 202a is configured to apply intrusion detection rules portions R3 and R4 of the intrusion detection rules for packets whose encapsulating header indicates overlay 2. This is an example, and the network infrastructure device 202a may be configured to apply fewer or more intrusion detection rules portions, for fewer or more overlays. Furthermore, other examples may not utilize overlays at all.

Other network infrastructure devices in the FIG. 2 example network that have a bold outline may also be configured to apply different portions of the intrusion detection rules, depending on one or more overlays to which the respective network infrastructure device belongs and which a packet under inspection indicates. Similar indications to the indication 216 are not shown in FIG. 2 for these other network infrastructure devices, for simplicity of illustration. For example, though, the infrastructure device 208a may be configured to apply, for packets whose encapsulating header indicates overlay 1, intrusion detection rules portions R1 and R3; and for packets who encapsulating header indicates overlay 5, intrusion detection rules portions R2 and R5. Furthermore, the network infrastructure device 214 may be configured to apply, for packets whose encapsulating header indicates overlay 1, intrusion detection rules portions R2 and R4; for packets whose encapsulating header indicates overlay 2, intrusion detection rules portions R5 and R6; for packets whose encapsulating header indicates overlay 3, intrusion detection rules portions R3 and R1; and for packets whose encapsulating header indicates overlay 4, intrusion detection rules portions R2 and R6. Each other network infrastructure devices illustrated in the FIG. 2 example network infrastructure 200 with a bold outline may be configured to apply one or more intrusion detection rules portions for packets whose encapsulating header indicates a particular overlay.

Thus, for example, a packet entering the example network infrastructure 200 at building 211 in building layer 201 of the example network infrastructure 200 may arrive at network infrastructure device 202a, destined for network infrastructure device 218c, with an encapsulating header indicating overlay 1. This is indicated by "1" in FIG. 2. Using the example configuration described above, for packets whose encapsulating header indicates overlay 1, network infrastructure device 202a is configured to apply intrusion detection rules portions R5 and R6. Therefore, network infrastructure device 202a applies intrusion detection rules portions R5 and R6 to the packet. Furthermore, the network infrastructure device 202a may indicate, in the encapsulating header of the packet, that intrusion detection rules portions R5 and R6 have been applied.

The packet, whose encapsulating header indicates overlay 1, is provided (as indicated by "2") from network infrastructure device 202a to network infrastructure device 208a, in accordance with the indication of overlay 1 in the encapsulating header. Using the example configuration described above, for packets whose encapsulating header indicates overlay 1, network infrastructure device 208a is configured to apply intrusion detection rules portions R1 and R3. Therefore, network infrastructure device 218a applies intrusion detection rules portions R1 and R3 to the packet. Furthermore, the network infrastructure device 208a may indicate, in the encapsulating header of the packet, that intrusion detection rules portions R1 and R3 have been applied.

The packet, whose encapsulating header indicates overlay 1, is provided (as indicated by "3") from network infrastructure device 208a to network infrastructure device 214, in accordance with the indication of overlay 1 in the encapsulating header. Using the example configuration described above, for packets whose encapsulating header indicates overlay 1, network infrastructure device 214 is configured to apply intrusion detection rules portions R2 and R4. Therefore, network infrastructure device 214 applies intrusion detection rules portions R2 and R4 to the packet. Furthermore, the network infrastructure device 214 may indicate, in the encapsulating header of the packet, that intrusion detection rules portions R2 and R4 have been applied.

After application of intrusion detection rules portions R2 and R4 to the packet by network infrastructure device 214, all the intrusion detection rules have been applied to the packet. The packet proceeds to its destination of network infrastructure device 218c, via network infrastructure device 218a in the server farm layer 205 (as indicated by "4" in FIG. 2) and on to network infrastructure device 218c in the server farm layer 205 (as indicated by "5" in FIG. 2). The encapsulating header indicates that all the intrusion detection rules portions—R1, R2, R3, R4, R5 and R6) have been applied to the packet. Therefore, the intrusion detection inspection, as carried out in a distributed manner by various network infrastructure devices in the example network infrastructure 200, has been carried out on the packet with one hundred percent efficacy.

In some examples, not all the intrusion detection rules portions will have been applied to a particular packet, and so the intrusion detection inspection in those examples will generally be carried out with less than one hundred percent efficacy. The one or more overlays, as well as the configuration of the infrastructure devices of the example network infrastructure 200, may be configured so that a packet whose encapsulating header indicates a particular overlay will, as it traverses the infrastructure devices of the example network infrastructure 200, have the intrusion detection inspection carried out with a specified efficacy, which may be less than one hundred percent efficacy.

As mentioned previously, various forms of overlay encapsulation may be utilized for encapsulating a packet to which intrusion detection rules are to be applied. Example forms of overlay encapsulation include VXLAN, IPv6 and VLAN. Furthermore, in some examples, an encapsulating header according to the particular overlay protocol includes a security header in which network infrastructure devices (e.g., the network infrastructure devices of example network infrastructure 200) may indicate, in the security header, one or more portions of the intrusion detection rules the respective network infrastructure device applied to the packet. In some examples, multiple overlay methods may be mixed across multiple network infrastructure devices for distribution of rules and improved efficacy. For example, one network infrastructure device may support only VXLAN while another network infrastructure device may support both VXLAN and IPv6. Traffic received from the first network infrastructure device over VXLAN may be evaluated; all the rules evaluated by the first network infrastructure device and the second network infrastructure device may be mapped over an IPv6 overlay and sent to a third network infrastructure device which understands only IPv6.

Figure 3:
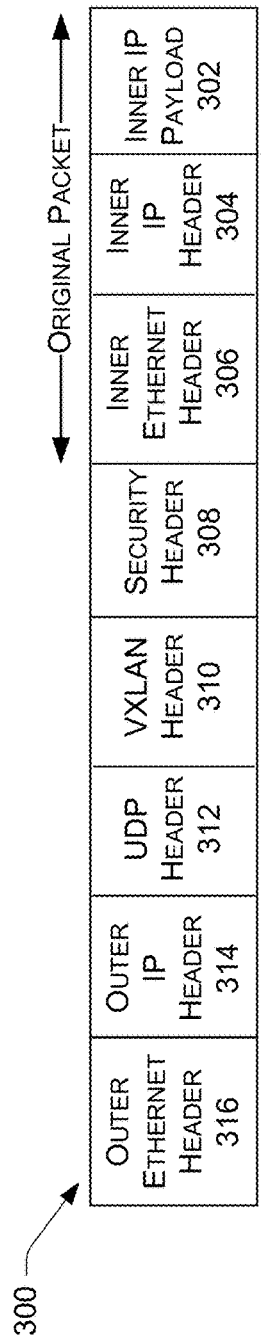
FIG. 3 illustrates an example of a packet utilized with a VXLAN overlay.

FIG. 3 illustrates an example packet 300 that has an overlay encapsulation according to an example VXLAN protocol, where the encapsulating header includes a security header. Referring to FIG. 3, the "original packet" prior to encapsulation includes an inner internet protocol (IP) payload portion 302, an inner IP header portion 304 and an inner ethernet header portion 306. The portions 302, 304 and 306 comprise the packet that originates, for example, from a device utilizing the example network infrastructure 200 to connect to network resources such as, for example, data centers and a WAN edge. A network infrastructure device in the access layer 209 may encapsulate the original packet with a VXLAN header portion 310, where the encapsulation further includes a security header 308. As mentioned, the security header 308 may be utilized, for example, for network infrastructure devices of the example network infrastructure 200 to indicate which one or more portions of the intrusion detection rules the respective network infrastructure device has applied to the original packet.

By encapsulating the original packet (inner IP payload portion 302, inner IP portion 304 and inner ethernet portion 306) with a VXLAN overlay, the original packet can be routed to particular network infrastructure devices that are configured to apply intrusion detection rule portions to packets with the indication of the VXLAN overlay in the encapsulating VXLAN header 310. During traversal of the example network infrastructure, the original packet encapsulated with a header indicating a VXLAN overlay configured like the example packet 300 can have portions of intrusion detection rules applied to it such that, collectively, the intrusion detection is carried out on the original packet with a specified efficacy, that may be as much as one hundred percent.

The FIG. 3 example packet 300 further includes a UDP header portion 312, and outer IP header portion 314 and an outer ethernet portion 316, encapsulating the VXLAN encapsulated portion of the example packet 300. The UDP header portion 312, outer IP header portion 314 and outer ethernet portion 316 may be used in routing the packet through network infrastructure devices of the example network infrastructure 200 to an endpoint of a tunnel of the VXLAN overlay.

Figure 4:
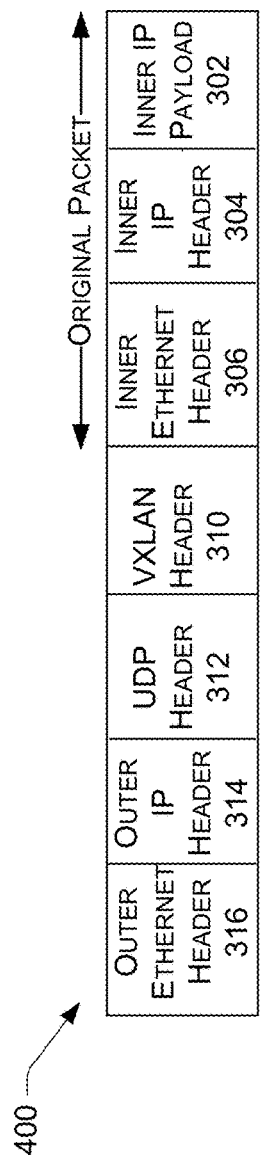
FIG. 4 illustrates another example of a packet utilized with a VXLAN overlay.

Turning now to FIG. 4, an illustration is provided of an example packet 400 that includes the original packet (inner IP payload portion 302, inner IP portion 304 and inner ethernet portion 306) encapsulated by a VXLAN header 310 but without a security header 308 as in the example packet 300. In some examples, as a packet configured like the example packet 400 traverses the example network infrastructure 200, the network infrastructure devices do not indicate in the packet which one or more intrusion detection rule portions the respective network infrastructure device has applied to the packet. However, there may be mechanisms other than a security header for the network infrastructure devices to indicate in such a packet which one or more intrusion detection rule portions the respective network infrastructure device has applied to the packet.

Still referring to the FIG. 4 example packet 400, the example packet 400 further includes the UDP header portion 312, the outer IP header portion 314 and the outer ethernet portion 316, encapsulating the VXLAN encapsulated portion of the example packet 400. As with the example packet 300, the UDP header portion 312, outer IP header portion 314 and outer ethernet portion 316 may be used in routing the packet through network infrastructure devices of the example network infrastructure 200 to an endpoint of a tunnel of the VXLAN overlay.

Figure 5:
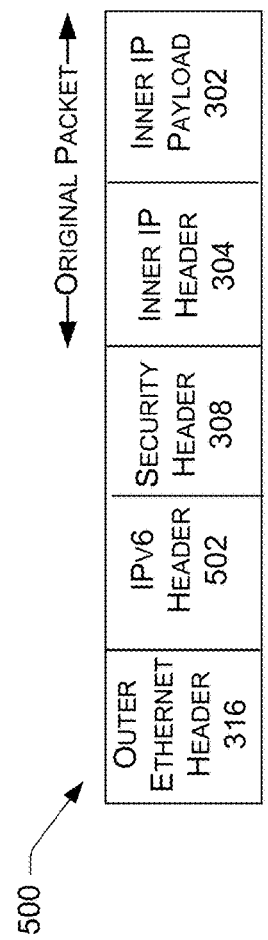
FIG. 5 illustrates an example packet utilized with an IPv6 overlay.

FIG. 5 illustrates an example packet 500 in which the overlay mechanism as an IPv6 overlay mechanism. In the FIG. 5 example packet, the original packet before overlay encapsulation includes the inner IP payload portion 302 and the inner IP header portion. Similar to the FIG. 3 example packet 300 and the FIG. 4 example packet 400, the portion 302 and 304 comprise the packet that originates, for example, from a device utilizing the example network infrastructure 200 to connect to network resources such as, for example, data centers and a WAN edge. A network infrastructure device in the access layer 207 may encapsulate the original packet with an IPv6 header portion 502, where the encapsulation further includes a security header 308. As mentioned, the security header 308 may be utilized, for example, for network infrastructure devices of the example network infrastructure 200 to indicate which one or more portions of the intrusion detection rules the respective network infrastructure device has applied to the original packet.

By encapsulating the original packet (inner IP payload portion 302 and inner IP portion 304) with an IPv6 overlay, the original packet can be routed to particular network infrastructure devices that are configured to apply intrusion detection rule portions to packets with the indication of the IPv6 overlay in the encapsulating IPv6 header 502. During traversal of the example network infrastructure, the original packet encapsulated with a header indicating an IPv6 overlay configured like the example packet 500 can have portions of intrusion detection rules applied to it such that, collectively, the intrusion detection is carried out on the original packet with a specified efficacy, that may be as much as one hundred percent.

The FIG. 5 example packet 500 further includes the outer ethernet header portion 316, encapsulating the IPv6 encapsulated portion of the example packet 500. The outer ethernet portion 316 may be used in routing the packet through network infrastructure devices of the example network infrastructure 200 to an endpoint destination of the IPv6-encapsulated overlay packet.

By encapsulating the original packet (inner IP payload portion 302, inner IP portion 304 and inner ethernet portion 306) with a VXLAN overlay, the original packet can be routed to particular network infrastructure devices that are configured to apply intrusion detection rule portions to packets with the indication of the VXLAN overlay in the encapsulating VXLAN header 310. During traversal of the example network infrastructure, the original packet encapsulated with a header indicating a VXLAN overlay configured like the example packet 300 can have portions of intrusion detection rules applied to it such that, collectively, the intrusion detection is carried out on the original packet with a specified efficacy, that may be as much as one hundred percent.

Figures 6, 7:
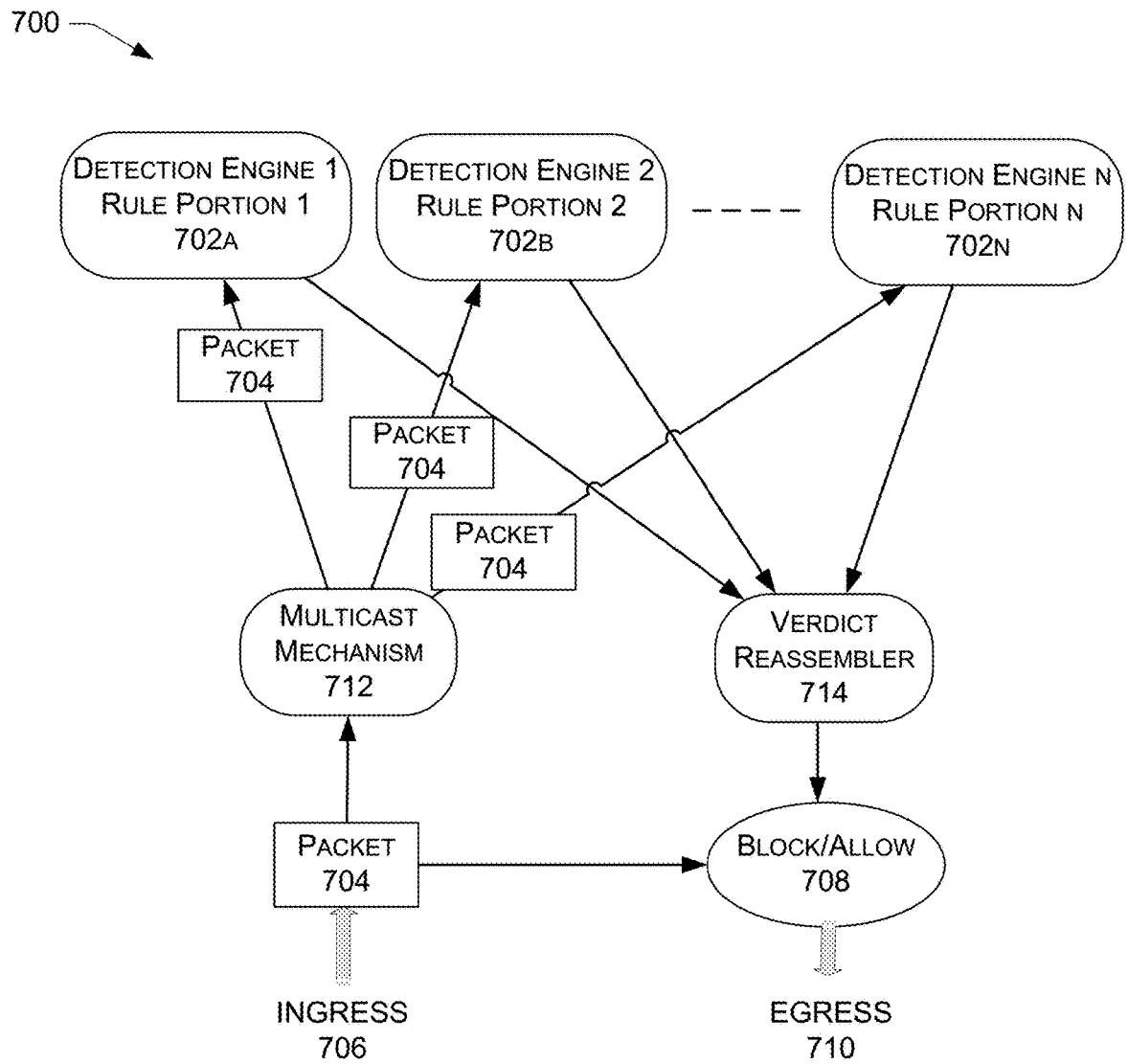
FIG. 6 illustrates an example of how each node traversed by a packet may indicate which rules that node applied.
FIG. 7 illustrates an architecture of another example system by which intrusion packet detection may be distributed across multiple devices.

FIG. 6 illustrates an example security header 600, in which each network infrastructure device that applies one or more portions of intrusion detection rules to a packet may indicate in the encapsulation of the packet which one or more portions of the intrusion detection rules that network infrastructure device applied. In the FIG. 6 example security header 600, a portion is provided corresponding to each of eight portions of intrusion detection rules. More specifically, in the FIG. 6 example, a portion 602 is provided corresponding to rule portion #1 of the intrusion detection rules; a portion 604 is provided corresponding to the rule portion #2 of the intrusion detection rules, and so on up to a portion 616 that is provided corresponding to the rule portion #8 of the intrusion detection rules. In one example, each of the portions 602, 604 and so on are one bit, where a zero indicates that the portion of the intrusion detection rules corresponding to that portion of the example security header 600 has not been applied to a packet encapsulated by a header including the example security header 600. By contrast, a one indicates that the portion of the intrusion detection rules corresponding to that portion of the example security header 600 has been applied to a packet encapsulated by a header including the example security header 600.

In one example, the portions of the security header 600 are initialized to zero as the packet including the example security header 600 enters the example network infrastructure 200 or otherwise before any portions of the intrusion detection rules are applied to the packet Furthermore, in some examples, by inspecting the security header such as the example security header 600, a network infrastructure device may determine which rule portions are yet to be applied to a packet. The network infrastructure device may determine to what network infrastructure devices the packet should be subsequently provided, such that the intrusion detection portions are applied to the packet to achieve a specified efficacy of intrusion detection.

In some examples, some (or all) network infrastructure devices are able to apply all (or some subset, such as a substantial subset) of rule portions but, for any particular packet, each device actually applies fewer than all the rule portions, passing the packet on one or more other devices to inspect the rule portion(s) yet to be applied. Each device may set a bit in the packet, for example, to indicate which rule portion(s) the respective device inspected. In some examples, an efficacy measure accounts for an importance of each rule portion, such as ascribing greater importance to rule portions that would be applied to detect the greatest intrusion threats.

FIG. 7 illustrates an architecture of example system 700 by which intrusion packet detection may be distributed across multiple network infrastructure devices, such as the network infrastructure devices 702a, 702b, . . . , 702n. Each of the network infrastructure devices 702a to 702n is configured to apply a different portion of the intrusion detection rules. In some examples, there is no overlap among the different portions while, in other examples, there is overlap among the different portions. A packet 704 to which intrusion detection rules is to be applied is input to the example system 700 via an ingress interface 706. Depending on the result of applying the intrusion detection rules, the packet 704 is provided by an allow/block mechanism 708 to an egress interface 710 of the example system 700.

The packet 704 input to the example system 700 via the ingress interface 706 is provided by a multicast mechanism 712 to the network infrastructure devices 702a to 702n. The multicast mechanism 712 may provide the packet 704, for example, to the network infrastructure devices 702a to 702n as a result of the network infrastructure devices 702a to 702n having subscribed to a particular multicast group, to apply the intrusion detection rules. In the FIG. 7 example system 700, each network infrastructure device 702a to 702n applies a different rule portion. In some examples, though, each network infrastructure device 702a to 702n may apply more than one rule portion, or the rule portions applied by the different detection engines 706 may overlap. Each network infrastructure device 702a to 702n may report, such as by unicast transmission, to a verdict reassembler 714, a result of applying the corresponding portion of intrusion detection rules. The verdict reassembler 714 processes the reported detection results and determines whether the packet represents an intrusion. The verdict reassembler 714 reports its determination to the block/allow mechanism 708, to which the packet 704 has also been provided from the ingress interface 706. The block/allow mechanism 708 which either blocks or allows the packet from proceeding further into a network, based on the determination from the verdict reassemble 714.

Figure 8:
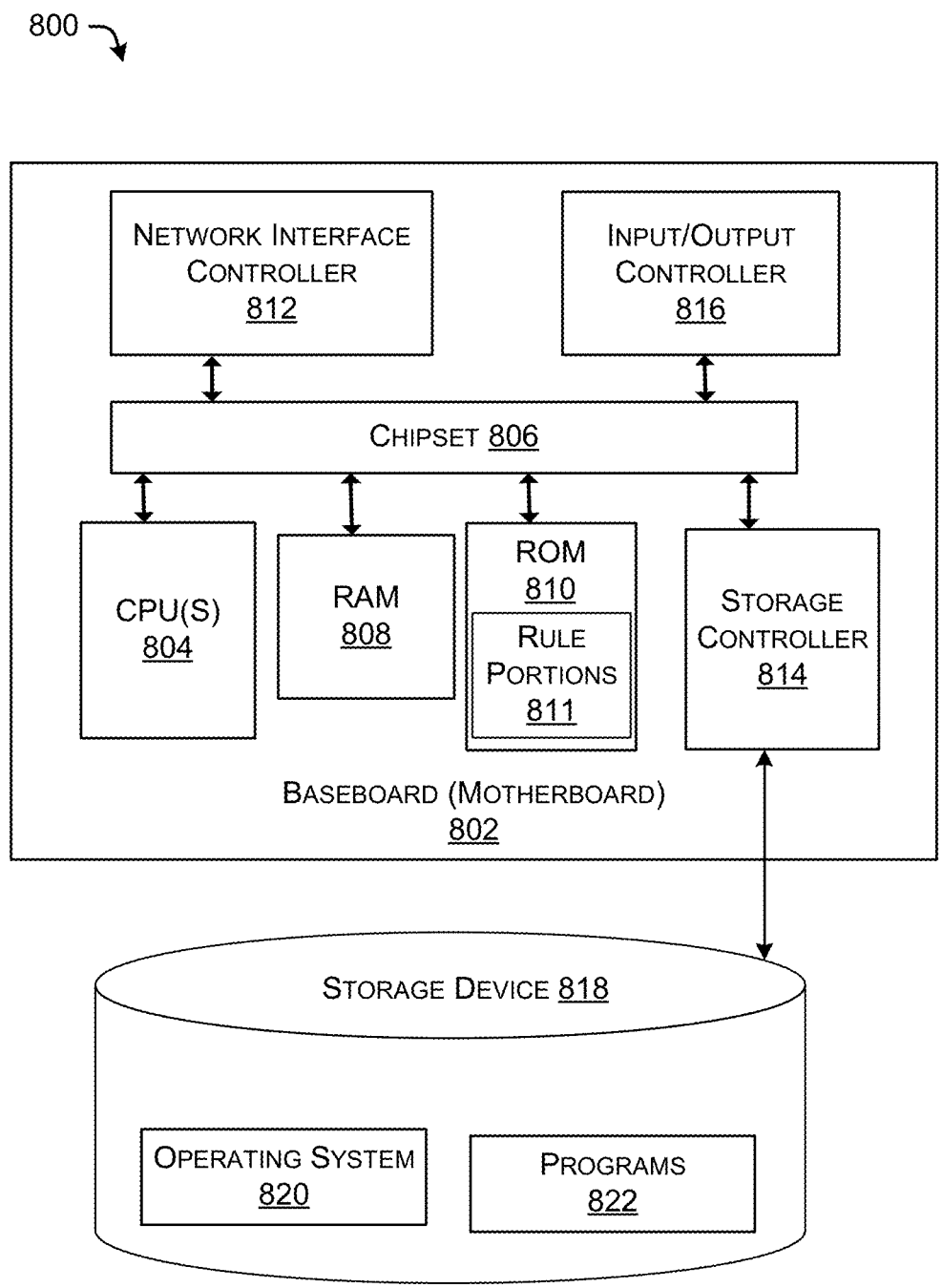
FIG. 8 illustrates an example computer architecture for a computer capable of executing program components for implementing intrusion detection functionality.

FIG. 8 illustrates an example computer architecture for a computer 800 capable of executing program components for implementing the functionality described above. The computer architecture shown in FIG. 8 illustrates an architecture of a server computer, workstation, desktop computer, laptop, tablet, network appliance, e-reader, smartphone, network switch, or other computing device, and can be utilized to execute any of the software components presented herein. The computer 800 may, in some examples, correspond to a network infrastructure device discussed herein.

The computer 800 includes a baseboard 802, or "motherboard," which may be a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be, for example, standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein. As illustrated in FIG. 8, the ROM 810 or NVRAM can also store portions of the intrusion detection rules. In other examples, the intrusion detection rules may be stored elsewhere, such as in RAM 808.

The computer 800 can operate in a networked environment using logical connections to remote computing devices and computer systems through a network. For example, the chipset 806 can include functionality for providing network connectivity through a Network Interface Controller (NIC) 812, such as a gigabit Ethernet adapter. The NIC 812 can connect the computer 800 to other computing devices over a network. It should be appreciated that multiple NICs 812 can be present in the computer 800, connecting the computer to other types of networks and remote computer systems. In some instances, the NICs 812 may include at least one ingress port and/or at least one egress port. An input/output controller 816 may be provided for other types of input/output.

The computer 800 can be connected to a storage device 818 that provides non-volatile storage for the computer. The storage device 818 can store an operating system 820, programs 822, and data, for example. The storage device 818 can be connected to the computer 800 through a storage controller 814 connected to the chipset 806. The storage device 818 can include one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like. For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the storage device 818 described above, the computer 800 can have access to other computer-readable storage media to store and retrieve information, such as program modules, data structures, or other data, including intrusion detection rules. It should be appreciated by those skilled in the art that computer-readable storage media is any available media that provides for the non-transitory storage of data and that can be accessed by the computer 800.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of applying intrusion detection rules to a packet in a network, comprising:
discovering, at an edge device of the network, a first infrastructure device in the network that applies a first portion of the intrusion detection rules and a second infrastructure device in the network that applies a second portion of the intrusion detection rules, wherein the second portion of the intrusion detection rules are applied by the second infrastructure device based at least in part on the first portion of the intrusion detection rules;
determining, at the edge device of the network and based at least in part on the first portion of the intrusion detection rules and the second portion of the intrusion detection rules, a route through the network towards a destination of the packet, wherein the route includes the first infrastructure device and the second infrastructure device;
causing the packet to traverse the route;
at the first infrastructure device of the network, applying the first portion of the intrusion detection rules to the packet and tagging the packet to indicate the first portion of the intrusion detection rules have been applied to the packet; and
at the second infrastructure device of the network, applying the second portion of the intrusion detection rules to the packet.

2. The method of claim 1, further comprising:
providing the packet to the first infrastructure device and to the second infrastructure device by a multicast transmission of the packet.

3. The method of claim 1, further comprising:
providing the packet from the first infrastructure device to the second infrastructure device.

4. The method of claim 3, wherein providing the packet from the first infrastructure device to the second infrastructure device is according to a routing algorithm.

5. The method of claim 1, further comprising:
at the second infrastructure device, tagging the packet to indicate the second portion of the intrusion detection rules have been applied to the packet.

6. The method of claim 1, further comprising:
at the first infrastructure device, determining that the second portion of the intrusion detection rules have not been applied to the packet; and
providing the packet from the first infrastructure device to the second infrastructure device based at least on a result of the determination.

7. The method of claim 6, wherein the determining further includes determining an efficacy of the intrusion detection rules that have been applied to the packet.

8. The method of claim 1, further comprising:
providing the packet from the first infrastructure device to the second infrastructure device based at least on an overlay to which the packet belongs.

9. The method of claim 8, wherein the overlay comprises one of a group of VXLAN with security header, VXLAN without security header, IPv6 or VLAN.

10. The method of claim 8, wherein:
the overlay is a first overlay; and
the method further comprises providing the packet from the second infrastructure device to a third infrastructure device, based on a second overlay that is different from the first overlay.

11. The method of claim 8, wherein:
the second infrastructure device applies the second portion of the intrusion detection rules based at least on the overlay to which the packet belongs.

12. A network system configured to apply intrusion detection rules to a packet, comprising:
an edge device associated with a network and configured to:
discover a first infrastructure device in the network that applies a first portion of the intrusion detection rules and a second infrastructure device in the network that applies a second portion of the intrusion detection rules, wherein the second portion of the intrusion detection rules are applied by the second infrastructure device based at least in part on the first portion of the intrusion detection rules;
determine, based at least in part on the first portion of the intrusion detection rules and the second portion of the intrusion detection rules, a route through the network towards a destination of the packet, wherein the route includes the first infrastructure device and the second infrastructure device; and
cause the packet to traverse the route;
the first infrastructure device, comprising:
one or more processors; and
one or more non-transitory computer-readable media storing computer-executable instructions that, when executed by the one or more processors, cause the one or more processors to perform first operations of:
applying the first portion of the intrusion detection rules to the packet and tagging the packet to indicate the first portion of the intrusion detection rules have been applied to the packet; and
the second infrastructure device, comprising:
one or more processors; and
one or more non-transitory computer-readable media storing computer-executable instructions that, when executed by the one or more processors, cause the one or more processors to perform second operations of:
applying the second portion of the intrusion detection rules to the packet.

13. The network system of claim 12, wherein causing the packet to traverse the route includes providing the packet to the first infrastructure device and to the second infrastructure device by a multicast transmission of the packet.

14. The network system of claim 12, wherein the first operations include:
providing the packet from the first infrastructure device to the second infrastructure device.

15. The network system of claim 14, wherein the first operations include:
providing the packet from the first infrastructure device to the second infrastructure device according to a routing algorithm.

16. The network system of claim 12, wherein:
the second operations include tagging the packet to indicate the second portion of the intrusion detection rules have been applied to the packet.

17. The network system of claim 12, wherein the first operations further include:
determining that the second portion of the intrusion detection rules have not been applied to the packet; and
providing the packet from the first infrastructure device to the second infrastructure device based at least on a result of the determination.

18. The network system of claim 17, wherein the determining of the first operations further includes determining an efficacy of the intrusion detection rules that have been applied to the packet.

19. The network system of claim 12, wherein the first operations further include:
    providing the packet from the first infrastructure device to the second infrastructure device based at least on an overlay to which the packet belongs.

20. The network system of claim 19, wherein:
    the overlay is a first overlay; and
    the network system further comprises a third network infrastructure device, wherein the second operations include providing the packet from the second infrastructure device to the third network infrastructure device, based on a second overlay that is different from the first overlay.

* * * * *